(12) United States Patent
Henson

(10) Patent No.: US 8,348,674 B2
(45) Date of Patent: Jan. 8, 2013

(54) TEST DISCRIMINATION AND TEST CONSTRUCTION FOR COGNITIVE DIAGNOSIS

(75) Inventor: Robert Aaron Henson, High Point, NC (US)

(73) Assignee: Educational Testing Service, Princeton, NJ (US)

( * ) Notice: Subject to any disclaimer, the term of this patent is extended or adjusted under 35 U.S.C. 154(b) by 1109 days.

(21) Appl. No.: 11/202,764

(22) Filed: Aug. 12, 2005

(65) Prior Publication Data

US 2006/0035207 A1 Feb. 16, 2006

Related U.S. Application Data

(60) Provisional application No. 60/600,899, filed on Aug. 12, 2004.

(51) Int. Cl.
*G09B 7/00* (2006.01)
(52) U.S. Cl. ........ 434/322; 434/156; 434/308; 434/319; 434/365; 273/429
(58) Field of Classification Search .................. 434/322, 434/350, 323, 353, 336, 365, 156, 308, 319; 273/429
See application file for complete search history.

(56) References Cited

U.S. PATENT DOCUMENTS 5,934,909 A * 8/1999 Ho et al. ........................ 434/362
5,954,516 A * 9/1999 Heinberg ...................... 434/322
6,000,945 A * 12/1999 Sanchez-Lazer et al. .... 434/322
2004/0076930 A1 * 4/2004 Steinberg et al. ............... 434/81
2004/0219504 A1 * 11/2004 Hattie ........................... 434/353
2005/0186551 A1 * 8/2005 Belov ............................ 434/323

OTHER PUBLICATIONS

Adema et al., Algorithms for Computerized Test Construction Using Classical Item Parameters, 1989, J Ed. Stat 14(3): 279-290.
Armstrong et al., IRT Test Assembly Using Network-Flow Programming, 1998, App. Psych. Meas. 22(3):237-247.
Armstrong et al., A study of a Network-Flow Algorithm and a Noncorrecting Algorithm for Test Assembly, 1996, App. Psych. Meas. 20(1):89-98.
Armstrong et al., Automated Parallel Test Construction Using Classical Test Theory, 1994, J. Ed. Stat. 19(1):73-90.
Ahuja et al., Network Flows: Theory, Algorithms, and Applications, 1993, Englewood, NJ, Prentice Hall (TOC).
Berger, A General Approach to Algorithmic Design of Fixed-Form Tests, Adaptive Tests, and Testlets, 1994, App. Psych. Meas. 18(2):141-153.

(Continued)

*Primary Examiner* — Xuan Thai
*Assistant Examiner* — Banafsheh Hadizonooz
(74) *Attorney, Agent, or Firm* — Jones Day

(57) ABSTRACT

A method, system and computer-readable carrier for using a discrimination index to select test items from an item bank for a test are disclosed. At least one parameter may be identified for each of a plurality of test items in an item bank. A first test item may be selected from the item bank based on at least the parameter for the test item. Each unselected test item may be evaluated to determine whether one or more constraints would be satisfied if the test item were selected. A next test item may be selected from the unselected test items that satisfy the one or more first constraints based on at least the parameter for each test item. The Evaluation and test item selection processes may be repeated until one or more second constraints are satisfied.

15 Claims, 3 Drawing Sheets

OTHER PUBLICATIONS

Birnbaum, Some Latent Trait Models and Their Use in Inferring an Examinee's Ability, 1968. In Lord et al., Statistical Theories of Mental Test Scores with contributions from Alan Birnbaum, Reading, MA, Addison-Wesley.

Boekkooi-Timminga, Simultaneous Test Construction by Zero-One Programming, 1987, Methodika 1(2):101-112.

Boekkooi-Timminga, The Construction of Parallel Tests from IRT-Based Item Banks, 1990, J. Ed. Stat. 15(2):129-145.

Chang et al., Optimal Stratification of Item Pools in α-Stratified Computerized Adaptive Testing, 2003, App. Psych. Meas. 27(4):262-274.

Chang et al., A Global Information Approach to Computerized Adaptive Testing, 1996, App. Psych. Meas. 20(3):213-229.

Cronbach, Coefficient Alpha and the Internal Structure of Tests, 1951, Psychomeuika 16(3):297-334.

Cronbach et al., Psychological Tests and Personnel Decisions $2^{nd}$ ed. 1965 Urbana, IL, U. of Illinois Press (TOC).

Dantzig, Discrete-Variable Extremum Problems, 1957, Operations Research 5:266-277.

Delatorre et al., Higher-Order Latent Trait Models for Cognitive Diagnosis, 2003, Psychmetrika 69(3):333-353.

Dibello et al., Unified Cognitive/Psychometric Diagnostic Assessment Likelihood-Based Classification Techniques, 1995, In Nichols et al. Cognitively diagnostic assessment, 361-389, Hillsdale , NJ, Erlbaum.

Doignon et al., Knowledge Spaces, 1999, New York, Springer-Verlag (TOC).

Embretson, Multicomponent Latent Trait Models for Test Design, 1985, In S. Embretson, Test Design: Developments in Psychology and Psychometrics, 195-218, NY, Academic Press.

Ford et al., Flows in Networks, 1962, Princeton, NJ, Princeton Univ. Press (TOC).

Gulliksen, Theory of Mental Tests, 1950, NY, Wiley (TOC).

Guttman, A Basis for Analyzing Test-Retest Reliability, 1945, Psychometrika 10(4): 255-282.

Hambleton et al., Item Response Theory-Principles and Applications, 2000, Boston, MA Kluwer Nijhoff Pub. (TOC).

Haertel, Using Restricted Latent Class Models to Map the Skill Structure of Achievement Items, 1989, J. Ed. Meas. 26(4): 301-321.

Hartz, A Bayesian Framework for the Unified Model for Assessing Cognitive Abilities: Blending Theory with Practicality, 2002, Unpublished Doctoral Dissertation (TOC).

Junker et al., Cognitive Assessment Models with Few Assumptions, and Connections with Nonparametric Item Response Theory, 2001, App. Psych. Meas. 25(3):258-272.

Kester, Various Mathematical Programming Approaches Toward Item Selection, 1988, Rep. No. 3 Project "Optimal Item Selection." Amhem, Netherlands: CITO.

Land et al., An Automatic Method for Solving Discrete Programming Problems, 1960, Econometrica 28(3): 497-520.

Lehmann et al., Theory of Point Estimation: $2^{nd}$ ed., 1998, Springer-Verlag NY, Inc. (TOC).

Lord, A Theory of Test Scores, 1952, Psychometric Monograph No. 7 (TOC).

Lord, An Application of Confidence Intervals and of Maximum Likelihood to Estimation of an Examinee's Ability, 1953, Psychometrika 18(1):57-75.

Lord, Applications of Item Response Theory to Practical Testing Problems, 1980, Hillsdale, NJ, Lawrence Erlbaum Assoc. (TOC).

Lord, Statistical Theories of Mental Test Scores with Contributions from Alan Birnbaum, 1968, Reading, MA, Addison-Wesley (TOC) and pp. 397-424.

Luecht, Computer-Assisted Test Assembly Using Optimization Heuristics, 1998, App. Psych. Meas. 22(3):224-236.

Luecht et al., Item Selection Using an Average Growth Approximation of Target Information Functions, 1992, App. Psych. Meas. 16(1): 41-51.

Maris, Estimating Multiple Classification Latent Class Models, 1999, Psychometrika 64(2):187-212.

MathWorks, Getting Started with Matlab, 2002, Natrick, MA: The MathWork, Inc. (TOC).

McDonald, Nonlinear Factor Analysis, 1967, Psychometric Monograph, No. 15 (TOC).

McDonald, Test Theory: A Unified Treatment, 1999, Mahwah, NJ: Lawrence Erlbaum Assoc. (TOC).

MacReady et al., The Use of Probabilistic Models in the Assessment of Mastery, 1977, J. Ed. Stat. 2(2):99-120.

Moret et al., Algorithms from P to NP: vol. 1, Design and Efficiency, 1991, Redwood, CA, Benjamin/Cummings Publishing (TOC).

Rao, Efficient Estimates and Optimum Inference Procedures in Large Samples, 1962, J. Royal Stat. Soc. Ser. B 24(1):46-72.

Rasch, An Item Analysis Which Takes Individual Differences into Account, 1966, British J. Math. & Stat. Psy. 19(1):49-57.

Sanders et al., Parallel Test Construction Using Classical Item Parameters, 1998, App. Psych. Meas. 22(3):212-223.

Swanson et al., A Model and Heuristic for Solving Very Large Item Selection Problems, 1993, App. Psych. Meas. 17(2): 151-166.

Spearman, The Abilities of Man: Their Nature and Measurement, 1927, NY: Macmillan (TOC).

Tatsuoka, Data analytic methods for latent partially ordered classification models, 2002, J. Royal Stat. Soc. Ser. C (Appl. Stat.) 51:337-350.

Tatsuoka, A Probabilistic Model for Diagnosing Misconceptions by the Pattern Classification Approach, 1985, J. Ed. Stat. 10(1):55-73.

Theunissen, Binary Programming and Test Design, 1985, Psychometrika 50(4):411-420.

Theunissen, Some Applications of Optimization Algorithms in Test Design and Adaptive Testing, 1986, App. Psych. Meas. 10(4):381-389.

Timminga, Solving Infeasibility Problems in Computerized Test Assembly, 1998, App. Psych. Meas. 22(3): 280-291.

U.S. House of Representatives, Text of No Child Left Behind, 2001.

Vanderlinden, Optimal Assembly of Psychological and Educational Tests, 1998, App Psych. Meas. 22(3):195-211.

Vanderlinden et al., A Zero-One Programming Approach to Gulliksen's Matched Random Subtests Method, 1988, App. Psych. Meas. 12(2):201-209.

Vanderlinden et al., A Maximum Model for Test Design with Practical Constraints, 1989, Psychometrika 54:237-247.

Vanderlinden et al., An Integer Programming Approach to Item Bank Design, 2000, App. Psych. Meas. 24(2):139-150.

Whitely, Multicomponent Latent Trait Models for Ability Tests, 1980, Psychometrika 45(4): 479-494.

Yamamoto, A Model that Combines IRT and Latent Class Model, 1987, Unpub. doctoral dissertation, U. of Illinois, Champaign-Urbana.

Zanakis et al., Heuristic Methods and Applications: A Categorized Survey, 1989, Eur. J. Oper. Res. 43:88-110.

\* cited by examiner

TEST DISCRIMINATION AND TEST CONSTRUCTION FOR COGNITIVE DIAGNOSIS

CROSS-REFERENCE TO RELATED APPLICATIONS

This patent application claims priority to, and incorporates by reference in its entirety, U.S. Provisional Patent Application No. 60/600,899, entitled "Test Discrimination and Test Construction for Cognitive Diagnosis" and filed Aug. 12, 2004

BACKGROUND

Standardized testing is prevalent in the United States today. Such testing is often used for higher education entrance examinations and achievement testing at the primary and secondary school levels. The prevalence of standardized testing in the United States has been further bolstered by the No Child Left Behind Act of 2001, which emphasizes nationwide test-based assessment to measure students' abilities to ensure appropriate grade placement and quality of education. However, unlike measurements that are made in the physical world, such as length and weight, measuring students' skills, knowledge and attributes that cannot be directly observed is challenging. Instead of measuring a particular skill, knowledge or attribute directly, the student must be measured based on a set of observable responses that are indicators of the skill, knowledge or attribute.

For example, if an examiner wanted to measure extraversion, it is not obvious what tool, or questionnaire, would be effective. Even if the examiner had an appropriate questionnaire, changes in repeated measurements of an individual's extraversion could be due to changes in both the construct and the error of measurement. Classical Test Theory (CTT) and Item Response Theory (IRT) provide methods for developing instruments to measure constructs such as extraversion. In addition, CTT and IRT both provide methods for obtaining an examinee's score, such as a score on a constructed extraversion scale.

The typical focus of research in the field of assessment measurement and evaluation has been on methods of IRT. A goal of IRT is to optimally order examinees along a low dimensional plane (typically, a one-dimensional plane) based on the examinee's responses and the characteristics of the test items. The ordering of examinees is done via a set of latent variables presupposed to measure ability. The item responses are generally considered to be conditionally independent of each other.

The typical IRT application uses a test to estimate an examinee's set of abilities (such as verbal ability or mathematical ability) on a continuous scale. An examinee receives a scaled score (a latent trait scaled to some easily understood metric) and/or a percentile rank. The final score (an ordering of examinees along a latent dimension) is used as the standardized measure of competency for an area-specific ability.

Although achieving a partial ordering of examinees remains an important goal in some settings of educational measurement, the practicality of such methods is questionable in common testing applications. For each examinee, the process of acquiring the knowledge that each test purports to measure seems unlikely to occur via this same low dimensional approach of broadly defined general abilities. This is, at least in part, because such testing can only assess a student's abilities generally, but cannot adequately determine whether a student has mastered a particular ability or not.

Alternatively, estimation of an examinee's "score" is not the focus in some cases. For example, a teacher may be interested in estimating students' profiles. The profile for each student specifies a set of dichotomous skills, or attributes, that a student has or has not mastered. A profile of discrete attributes provides the teacher with information about the instructional needs of groups of students (unlike multidimensional IRT which provides a profile of scores). Cognitive Diagnosis Models (CDMs) can be used when the interest of a test is to estimate students' profiles, or attribute mastery patterns, instead of providing a general estimate of ability.

Many high stakes decisions, such as admission to a school, require that examinees be ordered along several one-dimensional scales. Dichotomous decisions (e.g., accepted or not) are made based on whether an applicant's scores are higher than a determined threshold along each of the one-dimensional scales. For example, tests such as the Graduate Record Examination (GRE) provide examinees with a score from 200 to 800 for their general mathematical ability, analytical ability and verbal ability. An applicant to a school may only be accepted if he or she scores above a certain threshold (e.g., 500) on all three scales. Low stakes tests within a classroom can be used to determine how students are doing on a set of skills, or attributes, and do not necessarily require a score for each student. CDMs break down general ability into its basic elements or fine-grained attributes that make up ability.

CDMs model the probability of a correct response as a function of the attributes an examinee has mastered. If an examinee has mastered all of the attributes required for each step, it is likely that the item will be answered correctly. CDMs are used to estimate an examinee's mastery for a set of attributes given the responses to the items in a test (i.e., CDMs can be used for classification). All examinees that have mastered the same set of attributes form a class and have the same expected value on a given item. Therefore, many CDMs are a special case of latent class models where each class is defined by mastery or non-mastery of a set of attributes. In addition, CDMs can provide information about the quality of each item.

Numerous cognitive diagnosis models have been developed to attempt to estimate examinee attributes. In cognitive diagnosis models, the atomic components of ability, the specific, finely grained skills (e.g., the ability to multiply fractions, factor polynomials, etc.) that together comprise the latent space of general ability, are referred to as "attributes." Due to the high level of specificity in defining attributes, an examinee in a dichotomous model is regarded as either a master or non-master of each attribute. The space of all attributes relevant to an examination is represented by the set $\{\alpha_1, \ldots, \alpha_k\}$. Given a test with items i=1, ..., J, the attributes necessary for each item can be represented in a matrix of size J×K. This matrix is referred to as a Q-matrix having values $Q=\{q_{jk}\}$, where $q_{jk}=1$ when attribute k is required by item j and $q_{jk}=0$ when attribute k is not required by item j. The Q-matrix is assumed to be known and currently there are only a few methods that can verify whether the Q-matrix is supported by the data. Also, the Q-matrix implicitly assumes that expert judges can determine the strategy used for each item and that only that strategy is used.

Since the Q-matrix should be designed such that the attribute parameters of all examinees can be estimated, if a test were to be constructed, some Q-matrices are naturally better than others. For example, the following represents two Q matrices, $Q_1$ and $Q_2$, for a five item test testing three attributes.

$$Q_1 = \begin{pmatrix} 1 & 0 & 0 \\ 0 & 1 & 0 \\ 0 & 0 & 1 \\ 1 & 1 & 0 \\ 0 & 1 & 1 \end{pmatrix} Q_2 = \begin{pmatrix} 0 & 0 & 1 \\ 1 & 1 & 0 \\ 0 & 0 & 1 \\ 1 & 1 & 0 \\ 0 & 0 & 1 \end{pmatrix}$$

$Q_1$ corresponds to a test where each attribute is measured at least 2 times. For example, the first item and the fourth item require mastery of attribute 1. In addition, if all items are deterministic (i.e., the probability of a correct response is either 1 or 0), all examinees' attribute patterns could be perfectly identified. The second test, represented by $Q_2$, also measures each attribute at least twice. However, attribute 1 and attribute 2 are confounded. Specifically, even if the probability of a correct response is 1 if all the required attributes are mastered and 0 otherwise, certain attribute patterns could not be identified. Accordingly, the test corresponding to $Q_1$ would be preferred over $Q_2$. Thus, the quality of a test not only depends on the items' ability to separate the examinees into classes, but also that an index used to measure the value of an item, or method of test construction, is incorporated in the Q-matrix.

Cognitive diagnosis models can be sub-divided into two classifications: compensatory models and conjunctive models. Compensatory models allow for examinees who are non-masters of one or more attributes to compensate by being masters of other attributes. An exemplary compensatory model is the common factor model. High scores on some factors can compensate for low scores on other factors.

Numerous compensatory cognitive diagnosis models have been proposed including: (1) the Linear Logistic Test Model (LLTM) which models cognitive facets of each item, but does not provide information regarding the attribute mastery of each examinee; (2) the Multicomponent Latent Trait Model (MLTM) which determines the attribute features for each examinee, but does not provide information regarding items; (3) the Multiple Strategy MLTM which can be used to estimate examinee performance for items having multiple solution strategies; and (4) the General Latent Trait Model (GLTM) which estimates characteristics of the attribute space with respect to examinees and item difficulty.

Conjunctive models, on the other hand, do not allow for compensation when critical attributes are not mastered. Such models more naturally apply to cognitive diagnosis due to the cognitive structure defined in the Q-matrix and will be considered herein. Such conjunctive cognitive diagnosis models include: (1) the DINA (deterministic inputs, noisy "AND" gate) model which requires the mastery of all attributes by the examinee for a given examination item; (2) the NIDA (noisy inputs, deterministic "AND" gate) model which decreases the probability of answering an item for each attribute that is not mastered; (3) the Disjunctive Multiple Classification Latent Class Model (DMCLCM) which models the application of non-mastered attributes to incorrectly answered items; (4) the Partially Ordered Subset Models (POSET) which include a component relating the set of Q-matrix defined attributes to the items by a response model and a component relating the Q-matrix defined attributes to a partially ordered set of knowledge states; and (5) the Unified Model which combines the Q-matrix with terms intended to capture the influence of incorrectly specified Q-matrix entries.

Another aspect of cognitive diagnostic models is the item parameters. For the DINA model, items divide the population into two classes: (i) those who have all required attributes and (ii) those who do not. Let $\xi_{ij}$ be an indicator of whether examinee i has mastered all of the required attributes for item j. Specifically, $$\xi_{ij} = \prod_{k=1}^{K} \alpha_{ik}^{q_{jk}},$$

where $\alpha_i$ is a (K×1) 0/1 vector such that the $k^{th}$ element for the $i^{th}$ examinee, $\alpha_{ik}$, indicates mastery, or non-master, of the $k^{th}$ attribute.

Given $\xi_{ij}$, only two parameters $s_j$ and $g_j$, are required to model the probability of a correct response. $s_j$ represents the probability that an examinee answers an item incorrectly when, in fact, the examinee has mastered all of the required attributes (a "slipping" parameter). Conversely, $g_j$ represents the probability that an examinee answers an item correctly when, in fact, the examinee has not mastered all of the required attributes (a "guessing" parameter).

$$s_j = P(X_{ij} = 0 | \xi_{ij} = 1)$$

$$g_j = P(X_{ij} = 1 | \xi_{ij} = 0)$$

If the $j^{th}$ item's parameters and $\xi_{ij}$ are known, the probability of a correct response can be written as:

$$P(X_{ij} = 1 | \xi_{ij}, s_j, g_j) = (1 - s_j)^{\xi_{ij}} g_j^{(1 - \xi_{ij})}$$

The guess and slip parameters indicate how much information an item provides. If the slip parameter is low an examinee who has mastered all of the required attributes is likely to correctly answer the question. If the guess parameter is low, it is unlikely that an examinee missing at least one of the required attributes correctly responds to the item. Therefore, when $s_j$ and $g_j$ are low, a correct response implies, with almost certainty, that the examinee has mastered all required attributes. As the values of $s_j$ and $g_j$ increase, the item provides less information, and attribute mastery is less certain. Therefore, a measure that indicates the value of an item should be largest when both $s_j$ and $g_j$ are 0 (i.e., the item is deterministic) and should decrease as the values of $s_j$ and $g_j$ increase.

One concern is that the DINA model partitions the population into only two equivalence classes per item. Such a model may thus be viewed as an oversimplification since missing one attributed is equivalent to missing all required attributes. In some situations, it might be realistic to expect that an examinee lacking only one of the required attributes has a higher probability of a correct response as compared to an examinee lacking all of the required attributes. A number of models consider such a possibility, such as the NIDA model and the RUM model.

The NIDA model accounts for different contributions from each attribute by defining "slipping," $s_k$, and "guessing," $g_k$, parameters for each attribute, independent of the item. The probability of a correct response is the probability that all required attributes are correctly applied. Specifically, since all slipping and guessing parameters are at the attribute level instead of the item level, a new latent variable $\eta_{ijk}$ is defined at the attribute level, such that $\eta_{ijk}$ is 1 if attribute k was correctly applied by examinee i on item j and 0 otherwise. $s_k$ and $g_k$ can thus be defined in terms of $\eta_{ijk}$ given the Q-matrix and examinee's attribute mastery as:

$$s_k = P(\eta_{ijk} = 0 | \alpha_{ik} = 1, q_{jk} = 1)$$

$$g_k = P(\eta_{ijk} = 1 | \alpha_{ik} = 0, q_{jk} = 1)$$

As such, the probability of a correct response is equal to the probability that all required attributes are correctly applied. The NIDA model defines the probability of a correct response as:

$$P(X_{ij} = 1 \mid \alpha_i, s, g) = \prod_{k=1}^{K} \left[ (1 - s_k)^{\alpha_{ik}} g_k^{1-\alpha_{ik}} \right]^{q_{jk}}$$

where $s=\{s_1, \ldots, s_k\}$ and $g=\{g_1, \ldots, g_k\}$.

In this model, no specific item parameters are used. Since the guessing and slipping parameters for the NIDA model are for each attribute, only the Q-matrix distinguishes differences among items. Any two items that require the same attributes (i.e., the entries in the Q-matrix are identical) contribute equally to the estimation of an examinee's attribute pattern. in constructing a test, the value of a particular item then depends upon the attribute parameters and the Q-matrix. For example, if one attribute had low $s_k$ and $g_k$, an examinee must have that attribute to correctly answer any question that requires that attribute (i.e., there is a low probability of correctly guessing the answer when the attribute is absent and a low probability of slipping if the attribute is known). Thus, a single response can provide sufficient information about the attribute's mastery. In contrast, if an attribute has high slipping and guessing parameters, the attribute should be measured by more items to ensure adequate information regarding the attribute.

In an alternate NIDA model, the slipping and guessing parameters are estimated separately for each item. Accordingly, the probability of a correct response for the $j^{th}$ item is:

$$P(X_{ij} = 1 \mid \alpha_i, s, g) = \prod_{k=1}^{K} \left[ (1 - s_{jk})^{\alpha_{ik}} g_{jk}^{1-\alpha_{ik}} \right]^{q_{jk}}$$

In this model, items with low guessing and slipping parameters across all attributes are more informative about examinees' attribute patterns. Items having low guessing and slipping parameters better discriminate between examinees since only those examinees with all of the required attributes are likely to correctly answer the question. Moreover, those items having low guessing and slipping parameters for particular attributes provide more information about that attribute than for attributes having higher guessing and slipping parameters.

The Reparameterized Unified Model (RUM) extends the NIDA model by incorporating a continuous latent variable $\theta_i$ to account for any attributes not otherwise specified in the Q-matrix. This model utilizes a parameterization that eliminates a source of unidentifiability present in the NIDA model. In particular, to solve the identifiability problem the model includes a parameter that defines the probability of getting an item correct given that all required attributes have been mastered (denoted by $\pi_j^*$). Using the parameters of the extended NIDA model:

$$\pi_j^* = \prod_{k=1}^{K} (1 - s_{jk})^{q_{jk}}$$

Also, a penalty for each attribute that is not mastered for the $j^{th}$ item, $r_{jk}^*$, is defined as:

$$r_{jk}^* = \frac{g_{jk}}{1 - s_{jk}}$$

RUM allows for the possibility that not all required attributes have been explicitly specified in the Q-matrix by incorporating a general ability measure, $P_{cj}(\theta_i)$. Specifically, using RUM, the probability of a correct response can be written as:

$$P(X_{ij} = 1 \mid \alpha_i, \theta_i) = \pi_j^* \prod_{k=1}^{K} r_{jk}^{*(1-\alpha_{ik})q_{jk}} P_{c_j}(\theta_i),$$

where $P_{cj}$ is the logistic Rasch Model item characteristic curve with difficulty parameter $c_j$ and $\theta_i$ is a general measure of the $i^{th}$ examinee's knowledge not otherwise specified by the Q-matrix.

For each attribute not mastered, $P(X_{ij}=1\mid\alpha_i,\theta_i)$ is reduced by a factor of $r_{jk}^*$. Items having high $\pi_j^*$'s and low $r_{jk}^*$'s provide the most information about examinees' attribute patterns. In addition, the $r_{jk}^*$'s can provide some information about the Q-matrix. Specifically, if an $r_{jk}^*$ is close to 1, the probability of a correct response is approximately the same for those examinees who have or have not mastered the $k^{th}$ attribute for item j (assuming all other attributes are held constant). Thus, it is likely that the $k^{th}$ attribute is not required for the jth item and $q_{jk}$ should be set to 0. As in the NIDA models, items with low attribute patterns (i.e., $r_{jk}^*$) provide more information about examinee attribute mastery than when $r_{jk}^*$'s are high.

The NIDA and RUM models assume a discrete latent space characterized by mastery or non-mastery of K attributes. However, some conjunctive models assume a latent space defined by K continuous attributes. For example, the MLTM model using the Rasch model assumes that performance on a particular item requires K attributes where $k=\{1, \ldots, K\}$. Given an examinee's ability, the probability that the $k^{th}$ attribute is completed correctly equals the probability as defined by the Rasch model:

$$P_{jk}(\theta_i) = \frac{e^{(\theta_i - b_{jk})}}{1 + e^{(\theta_i - b_{jk})}},$$

where $b_{jk}$ is the difficulty parameter representing the difficulty of correctly applying the $k^{th}$ task for the $j^{th}$ item.

The model also assumes that, given $\theta$, all tasks are independent, so the probability of correctly answering an item is:

$$P(x_{ij} = 1 \mid \theta_i, b_{ij}) = (s_j - g_j) \prod_{k=1}^{K} \frac{e^{(\theta_{ik} - b_{jk})}}{1 + e^{(\theta_{ik} - b_{jk})}} + g_j,$$

where:
$g_j$ is the probability an examinee guesses the correct response for item j and
$s_j$ is the probability an examinee correctly applies the tasks for item j.

While CDMs can be useful in the analysis and interpretation of existing tests, specifying how to construct an adequate test using CDMs has been largely ignored.

What is needed is a method and system for developing tests incorporating an index for measuring how informative each item is for the classification of examinees.

A need exists for such a method and system in which indices are specific to each attribute for each item.

A further need exists for a method and system of developing a test in which the indices are used to select items for inclusion in the test based on the indices.

The present disclosure is directed to solving one or more of the above-listed problems.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to an "index" is a reference to one or more indices and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

In an embodiment, a method for using a discrimination index to select test items from an item bank for a test may include identifying a parameter for a plurality of test items in an item bank, selecting a first test item from the item bank based on at least the parameter for each test item, evaluating each unselected test item of the plurality of test items to determine whether one or more first constraints would be satisfied if the test item were selected, selecting a next test item from the unselected test items that satisfy the one or more first constraints based on at least the parameter for each test item, and repeating the evaluating and selecting a next test item steps until one or more second constraints are satisfied.

In an embodiment, a method for using a discrimination index to select test items from an item bank for a test may include identifying a parameter for each of a plurality of test items in an item bank, wherein each test item tests for one or more attributes, calculating a test item attribute index for each attribute for each test item, selecting a first test item from the item bank based on at least the parameter for each test item, evaluating each unselected test item of the plurality of test items to determine whether one or more first constraints would be satisfied if the test item were selected, summing the test item attribute indices for each attribute for each selected test item to calculate a test attribute index, selecting an attribute based on the test attribute indices for each attribute, selecting a next test item from the unselected test items that satisfy the one or more first constraints based on at least the test item attribute index for the selected attribute for each test item, and repeating the evaluating, summing, selecting an attribute, and selecting a next test item steps until one or more second constraints are satisfied.

In an embodiment, a computer-readable carrier containing one or more programming instructions performs a method for using a discrimination index to select test items from an item bank for a test. The method may include identifying a parameter for a plurality of test items in an item bank, selecting a first test item from the item bank based on at least the parameter for each test item; evaluating each unselected test item of the plurality of test items to determine whether one or more first constraints would be satisfied if the test item were selected, selecting a next test item from the unselected test items that satisfy the one or more first constraints based on at least the parameter for each test item, and repeating the evaluating and selecting a next test item steps until one or more second constraints are satisfied.

In an embodiment, a computer-readable carrier containing one or more programming instructions performs a method for using a discrimination index to select test items from an item bank for a test. The method may include identifying a parameter for each of a plurality of test items in an item bank, wherein each test item tests for one or more attributes, calculating a test item attribute index for each attribute for each test item, selecting a first test item from the item bank based on at least the parameter for each test item, evaluating each unselected test item of the plurality of test items to determine whether one or more first constraints would be satisfied if the test item were selected, summing the test item attribute indices for each attribute for each selected test item to calculate a test attribute index, selecting an attribute based on the test attribute indices for each attribute, selecting a next test item from the unselected test items that satisfy the one or more first constraints based on at least the test item attribute index for the selected attribute for each test item, and repeating the evaluating, summing, selecting an attribute, and selecting a next test item steps until one or more second constraints are satisfied.

BRIEF DESCRIPTION OF THE DRAWINGS

The accompanying drawings, which are incorporated in and form a part of the specification, illustrate various embodiments and, together with the description, serve to explain the principles of the various embodiments.

DETAILED DESCRIPTION

Figure 1A:
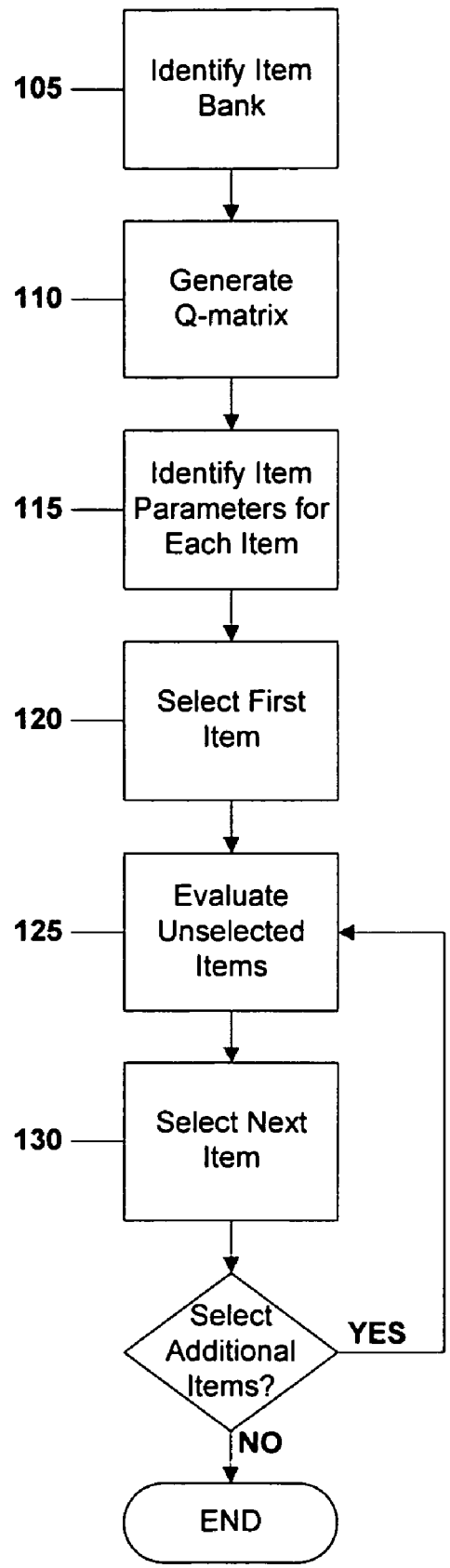
FIG. 1A depicts a flow diagram for an exemplary method for constructing a test according to an embodiment.

A "computer-readable carrier," as used in this disclosure, may include any medium or transmission that can contain, store, communicate, propagate, or transport the program for use by or in connection with the instruction execution system, apparatus, system or device. The computer readable carrier may include, by way of example only but not by limitation, an electronic, magnetic, optical, electromagnetic, infrared, and/or semiconductor system, apparatus, system, device, propagation medium, and/or computer memory.

When defining new indices, the properties of previous measures of a good item, or test, that are used in CTT and IRT may be considered. Appropriate indices may be easy to interpret, use all relevant information of the item parameters, and be defined on an item basis and/or a test basis. In both CTT and IRT, tests may be constructed to reduce the standard error of measurement (i.e., make reliability or information large). However, the concept of standard error may not apply to CDMs with a discrete latent examinee space because CDMs either correctly classify examinees or not. Accordingly, the focus in CDMs may be to design a test with high correct classification rates. If items are selected to make the responses of each examinee's latent class as different as possible, classification rates may increase. An index may use both the Q-matrix and the item parameters since each is relevant to a CDM. Moreover, it may be useful to define an index having a meaning and computation that is similar for both an item and a test so that these properties can be applied to test construction for CDMs.

Particular indices of interest may include the following: (i) Kullback-Leibler information, (ii) a CDM Test Discrimination Index, and (iii) CDM Attribute Discrimination Indices.

Kullback-Leibler Information Index

Indices of discrimination that are based on the Kullback-Leibler information may satisfy the three properties previously discussed. Kullback-Leibler information for discrimination may include a measure of proximity between any two probability distributions, $f(x)$ and $g(x)$. Formally, Kullback-Leibler information is defined as:

$$K[f, g] = E_f\left[\log\left[\frac{f(X)}{g(X)}\right]\right],$$

where the measure $K[f, g]$ is equal to the expectation with respect to $f(x)$ of the log-likelihood ratio of any two probability density functions $f(x)$ and $g(x)$.

$K[f, g]$ is not symmetric (i.e., $K[f, g] \neq K[g, f]$) and does not satisfy the triangle inequality, but does share some properties of distance measures. Specifically, as $K[f, g]$ increases, it may be easier to statistically discriminate between the two distributions. In addition, $K[f, g] \geq 0$, with equality when, and only when, f equals g. Moreover, $K[f(x), g(x)]$ may be related to the power of the likelihood ratio test for the null hypothesis, $f(x)$, versus the alternative hypothesis, $g(x)$, conducted at a fixed significance ratio. In particular, if $\beta_J(f(x), g(x))$ denotes the probability of type II error for an assessment of length J, the following relationship holds, $$\lim_{J\to\infty} \frac{\log[\beta_J(f(x), g(x))]}{-K_J[f(x), g(x)]} = 1.$$

Thus, the Kullback-Leibler information for discriminating between $f(x)$ and $g(x)$ is monotonically related to the power of the most powerful test of $f(x)$ versus $g(x)$ and therefore may be considered an indication of how well examinee mastery patterns may be discriminated.

The item response, X, may be a dichotomous variable. Since the probability distribution of X depends on the pattern of attribute mastery, α, Kullback-Leibler information may be an effective index for item selection in computer adaptive tests based on IRT models. According to Kullback-Leibler information, an item is most useful in determining the difference between an attribute mastery pattern, α, and an alternative attribute mastery pattern, α', if the Kullback-Leibler information for the comparison $P_\alpha(X)$ and $P_{\alpha'}(X)$, defined as $$K[\alpha, \alpha'] = E_\alpha\left[\log\left[\frac{P_\alpha(X)}{P_{\alpha'}(X)}\right]\right],$$

is large, where $P_\alpha(X)$ and $P_{\alpha'}(X)$ are the probability distributions of X conditional on α and α', respectively. Since X is dichotomous, $$K[\alpha, \alpha'] = P_\alpha(1)\log\left[\frac{P_\alpha(1)}{P_{\alpha'}(1)}\right] + P_\alpha(0)\log\left[\frac{P_\alpha(0)}{P_{\alpha'}(0)}\right].$$

$P_\alpha(1)$ and $P_{\alpha'}(1)$ may be defined by a CDM and $P_\alpha(0) = 1 - P_\alpha(1)$.

Kullback-Leibler information may also be calculated at the test level. Kullback-Leibler information for a test may compare the probability distribution for a test vector J item responses, X, given attribute pattern α when compared to the probability distribution of X given an alternative attribute pattern α'. The Kullback-Leibler information may be defined as $$K[\alpha, \alpha'] = E_\alpha\left[\log\left[\frac{P_\alpha(X)}{P_{\alpha'}(X)}\right]\right].$$

Since one assumption of latent CDMs is independence among items conditional on the attribute α, $$K[\alpha, \alpha'] = E_\alpha\left[\sum_{j=1}^{J}\log\left[\frac{P_\alpha(X_j)}{P_{\alpha'}(X_j)}\right]\right] = \sum_{j=1}^{J} E_\alpha \log\left[\frac{P_\alpha(X_j)}{P_{\alpha'}(X_j)}\right],$$

which is the sum of the Kullback-Leibler information for each item in the exam. Accordingly, the Kullback-Leibler test information is additive over all items in the test.

Kullback-Leibler information compares two attribute patterns at a time. Since Kullback-Leibler information is not symmetric, a total of $2^K(2^K-1)$ possible comparisons may be possible. To organize the $2^K(2^K-1)$ comparisons of all attribute pairs for the $j^{th}$ item, a $(2^K \times 2^K)$ matrix, $KL_j$, may be defined such that for each u, v element, $$KL_{juv} = E_{\alpha_u}\log\left[\frac{P_{\alpha_u}(X_j)}{P_{\alpha_v}(X_j)}\right].$$

For example, if the DINA model is used:

$$KL_{juv} = (1-s_j)^{\xi_{ju}} g_j^{(1-\xi_{ju})} \log\left[\frac{(1-s_j)^{\xi_{ju}} g_j^{(1-\xi_{ju})}}{(1-s_j)^{\xi_{jv}} g_j^{(1-\xi_{jv})}}\right] + \qquad \text{(Eqn. 1)}$$

$$s_j^{\xi_{ju}}(1-g_j)^{(1-\xi_{ju})} \log\left[\frac{s_j^{\xi_{ju}}(1-g_j)^{(1-\xi_{ju})}}{s_j^{\xi_{jv}}(1-g_j)^{(1-\xi_{jv})}}\right],$$

and if RUM is used:

$$KL_{juv} = \pi_j^* \prod_{k=1}^{K} r_{jk}^{*(1-\alpha_{uk})q_{jk}} \log\left[\frac{\pi_j^* \prod_{k=1}^{K} r_{jk}^{*(1-\alpha_{uk})q_{jk}}}{\pi_j^* \prod_{k=1}^{K} r_{jk}^{*(1-\alpha_{vk})q_{jk}}}\right] +$$

$$\left(1 - \pi_j^* \prod_{k=1}^{K} r_{jk}^{*(1-\alpha_{uk})q_{jk}}\right) \log\left[\frac{1 - \pi_j^* \prod_{k=1}^{K} r_{jk}^{*(1-\alpha_{uk})q_{jk}}}{1 - \pi_j^* \prod_{k=1}^{K} r_{jk}^{*(1-\alpha_{vk})q_{jk}}}\right]$$

where
- $\alpha_{uk}$ represents the $k^{th}$ element of the attribute mastery vector indicated by u, and
- $\alpha_{vk}$ represents the $k^{th}$ element of the attribute mastery vector indicted by v.

For the DINA model, a "good" item may be one that is nearly deterministic (i.e., $s_j \sim 0$ and $g_j \sim 0$) $KL_{juv}$ is large when $s_j$ and $g_j$ are small and decreases as $s_j$ and $g_j$ increase. For example, if $\xi_{ju} = 1$ and $\xi_{jv} = 0$, $$KL_{juv} = (1-s_j)\log\left[\frac{1-s_j}{g_j}\right] + s_j \log\left[\frac{s_j}{1-g_j}\right].$$

Similar results exist for the RUM if $\pi_j^*$ is large and all $r_{jk}^*$ are small, $KL_{juv}$s are large and decreases as $\pi_j^*$ decreases and all $r_{jk}^*$ increase.

For any exam of J items, $KL_t$ may be calculated by summing across the $KL_j$'s of the selected items. Accordingly, a test may be constructed by choosing items such that all of the elements in $KL_t$ are large. As such, the power to discriminate between any two attribute patterns may be high, and classification rates of examinees may be high.

CDM Test Discrimination Index

Each element of $KL_t$ may indicate how well a first attribute vector $\alpha$ is measured when compared to a second attribute vector $\alpha'$. However, focusing simultaneously on all elements $KL_j$ may be computationally intractable since the number of elements increases exponentially with K. Accordingly, indices that summarize the elements of $KL_j$ may be preferable.

The mean of the off-diagonal elements of $KL_j$ giving the average Kullback-Leibler distance between any two attribute patterns for item j is $$\overline{KL_j} = \frac{1}{2^K(2^K-1)} \sum_{u \neq v} KL_{juv}.$$

However, in CDMs, some comparisons may be more pertinent than others. For example, an examinee that has not mastered any attributes measure by a test may be easily discriminated from an examinee that has mastered all attribute patterns. On the other hand, attribute patterns that differ by only one component may be more difficult to distinguish. Accordingly, $KL_{juv}$'s for those comparisons may require more attention. In other words, if a test discriminates well between attribute patterns that are similar, the test may likely discriminate well between those attribute patterns that are dissimilar. If $\overline{KL_j}$ is used as a summary of the elements in $KL_j$, it is possible that high Kullback-Leibler information between highly dissimilar attribute mastery patterns may inflate the index when many attribute patterns of mastery may not be well discriminated. Thus, a weighted average, where each element is first weighted by the similarity or inverse "distance" between the attribute patterns, may be used. This may place more emphasis on comparisons between attribute patterns that are more similar.

One measure that may be used to determine the similarity of any two attribute patterns, $\alpha$ and $\alpha'$, is the squared Euclidean distance:

$$d^2(\alpha, \alpha') = \sum_{k=1}^{K} (\alpha_k - \alpha_k')^2.$$

Since the intent is to compare distance between attribute patterns, $d^2(\alpha, \alpha')$ may be normalized by dividing by the number of attributes K. Since any attribute pattern is a vector of 1's (masters) and 0's (non-masters), the squared Euclidian distance is equivalent to the Hamming distance, which is a count of the non-identical components of $\alpha$. Thus, if $d^2(\alpha, \alpha')$ is small, the two attribute patterns may be similar and may be given a greater emphasis that those attribute pairs with high $d^2(\alpha, \alpha')$.

Using the inverse of $d^2(\alpha, \alpha')$, a weighted mean may be calculated as a cognitive diagnostic index ($CDI_j$) of the discriminating power among attribute patterns for the $j^{th}$ item:

$$CDI_j = \frac{1}{\sum_{u \neq v} d^2(\alpha_u, \alpha_v)^{-1}} \sum_{u \neq v} d^2(\alpha_u, \alpha_v)^{-1} KL_{juv} \quad \text{(Eqn. 2)}$$

$CDI_j$ may be an indication of the discriminating power of a single item. However, the purpose may be to construct a test with as high a discriminating power as possible. The computation of $CDI_t$ may be identical to the computation of $CDI_j$ except that the Kullback-Leibler matrix for the test $KL_t$ is used. Thus, $$CDI_t = \frac{1}{\sum_{u \neq v} d^2(\alpha_u, \alpha_v)^{-1}} \sum_{u \neq v} d^2(\alpha_u, \alpha_v)^{-1} KL_{tuv}.$$

Since all $KL_{tuv}$s are linear functions of the $KL_{juv}$s for each item and $d^2(\alpha_u, \alpha_v)$ is constant between any two specific attribute patterns $\alpha_u$ and $\alpha_v$, $$CDI_t = \sum_{j=1}^{J} CDI_j.$$

The CDM discrimination of each item may be summarized in a single index. Moreover, constructing a test with a large $CDI_t$ that provides good discrimination between masters and non-masters may merely involve selecting items with large $CDI_j$'s. However, instances may occur when an item with a lower $CDI_j$ should be selected because the item measures an attribute not otherwise measured by the test. For example, if all items that measure a first attribute have larger CDIs than all items that measure a second attribute, selecting the items with the highest $CDI_j$ may result in selecting only items that measure the first attribute. Accordingly, the CDI measure may only be appropriate when used with constraints that focus on the entries of the Q-matrix.

CDM Attribute Discrimination Indices

While CDI may be used as a measure of test discrimination and for test construction, it may be advantageous to use a set of values that summarize different components of a test. Since cognitive diagnostic theory models the probability of a correct response as a function of mastery for K attributes, it may also be reasonable to define a discrimination index for each of the K attributes.

At least two important components may exist when defining correct classification rates: the correct classification of masters [i.e., $P(\alpha_k=1|\alpha_k=1)$] and the correct classification of non-masters [i.e., $P(\alpha_k=0|\alpha_k=0)$]. The purpose of the test (e.g., differing costs and benefits of classification) may often determine whether the correct classification of masters, or the correct classification of non-masters, is more important. Accordingly, a discrimination coefficient may be defined for the correct classification of the masters of the $k^{th}$ attribute, $\delta_k(1)$, and a discrimination coefficient for the correct classification of non-masters, $\delta_k(0)$.

By using the attribute patterns that only differ on the $k^{th}$ attribute, the corresponding $KL_{j_{uv}}$'s may describe the extent to which a master can be distinguished from a non-master on the $k^{th}$ attribute while holding attribute mastery constant on the remaining (K−1) attributes. Of the attribute comparisons that differ only by the $k^{th}$ attribute, $2^{K-1}$ comparisons describe the discrimination power of masters from non-masters (i.e., attribute patterns such that $\alpha_k=1$ and $\alpha_k=0$) and $2^{K-1}$ comparisons describe the discrimination power of non-masters from masters (i.e., attribute patterns such that $\alpha_k=0$ and $\alpha_k=1$).

One possible index ($\delta_k^A$) may compute the mean of the elements in $KL_j$ that satisfy these constraints, such that $$\delta_k^A(1) = \frac{1}{2^{K-1}} \sum_{\Omega_1} KL_j(\alpha, \alpha') \text{ and} \quad \text{(Eqn. 3)}$$

$$\delta_k^A(0) = \frac{1}{2^{K-1}} \sum_{\Omega_0} KL_j(\alpha, \alpha'), \quad \text{(Eqn. 4)}$$

where $\Omega_1 \in \{\alpha_k = 1 \cap \alpha'_k = 0 \cap \alpha_v = \alpha'_v \forall v \neq k\}$ and $\Omega_0 \in \{\alpha_k = 0 \cap \alpha'_k = 1 \cap \alpha_v = \alpha'_v \forall v \neq k\}$.

Index $\delta_{jk}^A$ may measure the average discrimination that an item contains regarding attribute k while controlling for the remaining attributes. The index may not incorporate prior knowledge about the testing population and may therefore assume that all attribute patterns are equally likely. If the $j^{th}$ item does not measure the $k^{th}$ attribute (i.e., the j, k element of the Q-matrix is 0), the item may contain no information about attribute mastery for the $k^{th}$ attribute and therefore $\delta_{jk}^A(1)$ and $\delta_{jk}^A(0)$ may be zero. While the index has been defined at the item level, the test discrimination index, $\delta_{tk}^A$, may be the sum of each item discrimination index selected for a test (i.e., $$\left(\text{i.e., } \delta_{tk}^A = \sum_{j=1}^{J} \delta_{jk}^A\right).$$

A second index ($\delta_{tk}^B$) may be used when prior testing has been used to calibrate the items and therefore some knowledge of the population characteristics exists. The second index is defined in terms of the expectation given the distribution of $\alpha$ is used (i.e., the prior probabilities or estimates of the prior probabilities, of the attribute patterns are used to weight the appropriate elements of $KL_j$), such that:

$$\delta_{jk}^B(1) = E_\alpha[KL_j(\alpha,\alpha')|\Omega_1] \text{ and}$$

$$\delta_{jk}^B(0) = E_\alpha[KL_j(\alpha,\alpha')|\Omega_0]$$

Provided that the distribution of $\alpha$ is known, or can be estimated:

$$\delta_{jk}^B(1) = \sum_{\Omega_1} wKL_j(\alpha, \alpha'), \quad \text{(Eqn. 5)}$$

where $w = P(\alpha|\alpha_k=1)$, and $$\delta_{jk}^B(0) = \sum_{\Omega_0} wKL_j(\alpha, \alpha'), \quad \text{(Eqn. 6)}$$

where $w = P(\alpha|\alpha_k=0)$

Like $\delta_{jk}^A$, $\delta_{tk}^A$ may provide a simple measure of discrimination. However, population information may be used to weight the elements of $KL_j$ to more strongly weight those elements for which $\alpha$ is more likely than less likely attribute parameters. $\delta_{tk}^B$ may be interpreted as the amount of information about attribute k provided by an item. If all $P(\alpha|\alpha_k=1)$ are equal, $\delta_{jk}^B(1) = \delta_{jk}^A(1)$ and, if all $P(\alpha|\alpha_k=0)$ are equal, $\delta_{jk}^B(0) = \delta_{jk}^A(0)$. Thus, $\delta_{jk}^A$ is a special case of $\delta_{tk}^B$. As with $$\delta_{jk}^A : \delta_{tk}^B = \sum_{j=1}^{J} \delta_{jk}^B.$$

While both $\delta_{jk}^A$ and $\delta_{jk}^B$ may discriminate the power of an item in assessing the $k^{th}$ attribute, information regarding attributes may be learned in other ways as well. For example, if two attributes k and k' are highly correlated (i.e., if an examinee is a master of attribute k then he or she is also likely to be a master of attribute k', and if an examinee is a non-master of attribute k then he or she is likely to be a non-master of attribute k'), then by knowing whether attribute k is mastered by an examinee, information regarding attribute k' may be inferred. Accordingly, an item that contains information regarding attribute k may also provide information about attribute k' even if the item does not require attribute k' for its solution. A discrimination index may need to incorporate all the information provided from the association between attributes if such information is available.

A third index ($\delta_{jk}^C$) may assume that if attributes are associated, the discrimination of the $k^{th}$ attribute provided by an item is a function of both the information about $\alpha_k$ contained in the item and the information provided from the known or estimated associations of $\alpha_k$ with other attributes measured by the test. To incorporate the additional information provided from the association of other attributes, associated attributes may be re-expressed as a function of a set of newly defined independent attributes. The likelihood functions used to compute entries of a $KL_j$ may then be re-expressed as a function of the independent attributes and the Kullback-Leibler information calculated for all attribute pairs. Since the true attributes are associated, each attribute may typically be a function of more than one of the independent attributes. For this reason, an item that does not measure $\alpha_k$ may still provide information about $\alpha_k$.

By defining a set of independent attributes for the $i^{th}$ subject, $\alpha_1^*, \ldots, \alpha_K^*$ such that $P(\alpha_{k'}^*=1|\alpha_k^*\forall k\neq k')=P(\alpha_{k'}^*=1)$ for all $k\neq k'$. To compute the discrimination index for the $k^{th}$ attribute, the association of each attribute with the $k^{th}$ attribute may be modeled by expressing the true attributes for the $i^{th}$ examinee, $\alpha_{i1}, \ldots, \alpha_{iK}$, as a function of the independent attributes: $\alpha_{im} = b_{im}\alpha_{ik}^* + (1-b_{im})\alpha_{im}^*$; $\forall i=1,\ldots, I$, where $b_{im}$ may be a random Bernoulli variable for the $i^{th}$ examinee with probability $P_{b_m}$ and all $b_{im}$ are assumed to be independent in m for each fixed i. By definition, as the association between the attributes increases the $P_{b_m}$ may be chosen to be larger. For a randomly selected examinee, all $2^K$ sequences of the $b_m$'s for $m=1,\ldots, K$ are possible (since all $b_m$ may be random independent Bernoulli variables). $B^l$ may be used to denote the vector of the $l^{th}$ possible combination of $b_1, \ldots, b_K$, where $l=\{1, \ldots, 2^K\}$.

If $KL_{jk}^l$ (i.e., the Kullback-Leibler matrix for the $j^{th}$ item, the $k^{th}$ attribute and the $l^{th}$ combination of $(b_1, \ldots, b_K)$, denoted $B^l = (B_1^l, \ldots, B_K^l)$, is calculated, discrimination indices for the $k^{th}$ attribute, $\Delta_{jk}^l(1)$ and $\Delta_{jk}^l(0)$, may be calculated using equations analogous to $\delta_{jk}^B(1)$ and $\delta_{jk}^B(0)$ written in terms of the independent attributes, $\alpha_1^*, \ldots, \alpha_K^*$. Specifically:

$$\Delta_{jk}^l(1) = \sum_{\alpha'\in\Omega_{1k}^l} wKL_{jk}^l(\alpha', \alpha'^*),$$

where $w=P(\alpha^*|\text{elements in } Q_{1k}^*)$, and $$\Delta_{jk}^l(0) = \sum_{\alpha^*\in\Omega_{0k}^*} wKL_{jk}^l(\alpha^*, \alpha'^*)$$

where $w=P(\alpha^*|\text{elements in } \Omega_{0k}^*)$.
Here, $\Omega_{1k}^*$ and $Q_{0k}^*$ are defined as:

$$\Omega_{1k}^* = \{\alpha_k^*=1\cap\alpha_k'^*=0\cap\alpha_v^*=\alpha_v'^*\forall v\neq k\}, \text{ and}$$

$$\Omega_{0k}^* = \{\alpha_k^*=0\cap\alpha_k'^*=1\cap\alpha_v^*=\alpha_v'^*\forall v\neq k\}.$$

$KL_{jk}^l$ may be calculated for all $2^K$ vectors $B^l$. In addition, $\Delta_{jk}^l(1)$ and $\Delta_{jk}^l(0)$ may be calculated for each $KL_{jk}^l$. The discrimination indices $\delta_{jk}^C(1)$ and $\delta_{jk}^C(0)$ may be defined as the expectations of $\Delta_{jk}^l(1)$ and $\Delta_{jk}^l(0)$, respectively, across all possible combinations $B^l$ for all $l=\{1, \ldots, 2^K\}$, as determined by the Bernoulli trials distribution for $B^l$:

$$\delta_{jk}^C(1) = E_{B_1}[\Delta_{jk}^l(1)] = \sum_{l=1}^{2^K} w_l\Delta_{jk}^l(1), \text{ and} \quad \text{(Eqn. 7)}$$

$$\delta_{jk}^C(0) = E_{B_1}[\Delta_{jk}^l(0)] = \sum_{l=1}^{2^K} w_l\Delta_{jk}^l(0), \quad \text{(Eqn. 8)}$$

where $w_l = \prod_{m=1}^{K}\left[p_{b_m}^{B_m^l}(1-p_{b_m})^{1-B_m^l}\right]$.

As with $\delta_{tk}^B$, $\delta_{jk}^C$ may incorporate information about the population by using prior probabilities of all attribute patterns as weights to determine comparisons that are more likely. In addition to using the prior probabilities of each attribute pattern to determine weights, $\delta_{jk}^C$ may also use the association between each attribute pattern pair in defining the individual Kullback-Leibler elements. By incorporating the association between attributes, the discrimination of the $k^{th}$ attribute may be a function of both the information contained about attribute k in the item, or test, and information provided by the estimated correlations of the other attributes with the $k^{th}$ attribute.

If the attributes are uncorrelated, $P_{b_k}=0$ for all $k=1,\ldots, K$ and therefore, $\delta_k^C=\delta_k^B$. In addition, if all attributes are uncorrelated and all conditional probabilities used to produce the weights for B are equal that it is also true that $\delta_k^C=\delta_k^B=\delta_k^A$.

Example

Using a simple one-item example calibrated using the DINA model may illustrate the calculations of the four indices (CDI, $\delta_k^A$, $\delta_k^B$, and $\delta_k^C$). The single item has a guessing parameter equal to 0.1, a slipping parameter equal to 0.2, and a Q-matrix entry equal to (1 0). To compute the four indices, the matrix KL must first be calculated using Eqn. 1 above. For this example:

$$KL = \begin{pmatrix} 0 & 0 & 1.36 & 1.36 \\ 0 & 0 & 1.36 & 1.36 \\ 1.14 & 1.14 & 0 & 0 \\ 1.14 & 1.14 & 0 & 0 \end{pmatrix},$$

where, in KL, rows (and columns) 1-4 represent examinees who have not master either attribute (0 0), examinees who have mastered only the second attribute (0 1), examinees who have mastered only the first attribute (1 0), and examinees who have mastered both attributes (1 1), respectively.

The i,j element of KL is the Kullback-Leibler information on the $i^{th}$ attribute pattern versus the $j^{th}$ attribute pattern, K[i,j].

To compute the CDI, using Eqn. 2, the weighted mean of each element in the matrix, using the inverse Hamming distance, is calculated. For example, the Hamming distance between (0 0) and (1 1) is 2 and therefore the weight used for that comparison in KL (i.e., xKL(1, 4)) is ½. The CDI is:

$$CDI = \frac{\begin{array}{l}0(0) + 1(0) + 1(1.36) + .5(1.36) + \ldots + \\ .5(1.14) + 1(1.14) + 1(0) + 0(0)\end{array}}{0+1+1+.5+\ldots+.5+1+1+0} = \frac{7.5}{10} = .75$$

To compute $\delta_1^A(1)$, only the elements that correspond to comparisons of examinee patterns (1 x) to (0 x) are considered, where x is either a 1 or a 0, as defined in Eqn. 3. Specifically, only the underlined elements below are considered:

$$KL = \begin{pmatrix} 0 & 0 & 1.36 & 1.36 \\ (0) & 0 & 1.36 & 1.36 \\ \underline{1.14} & 1.14 & 0 & 0 \\ 1.14 & \underline{1.14} & (0) & 0 \end{pmatrix},$$

For example, KL(3, 1) represents the comparison of examinee pattern (1 0) to examinee pattern (0 0). Since $\delta_1^A(1)$ is the average of the bold numbers, $$\delta_1^A(1) = \frac{1.14 + 1.14}{2} = \frac{2.28}{2} = 1.14$$

The discrimination index for attribute 2 may also be calculated using the entries in parentheses. Since the item does not require attribute 2, $\delta_2^A(1)=0$. Likewise, using Eqn. 4, $\delta_1^A(0)=1.36$, and $\delta_2^A(00)=0$.

To compute $\delta_1^B(1)$, the same underlined elements may be used. However, it may be assumed that information about the population is known or has been estimated. The index $\delta_1^B(1)$ is the weighted mean of the elements used for the index $\delta_1^A(1)$. For this example, a random examinee may have the attribute patterns (0 0), (0 1), (1 0), and (1 1) with probabilities 0.27, 0.43, 0.03 and 0.27, respectively. Accordingly, using Eqn. 5:

$$\delta_1^B(1) = \frac{.03(1.14) + .27(1.14)}{.3} = 1.14$$

Again, as with the computation of $\delta_2^A(1)$, $\delta_2^B(1)=0$. Moreover, the indices $\delta_1^B(0)=1.36$, and $\delta_2^B(0)=0$, as calculated using Eqn. 6.

To compute index $\delta_1^C(1)$, an association between attributes 1 and 2 is either known or can be estimated using tetrachoric correlations, which assume that a continuous normally distributed variable, $\overline{\alpha}$, exists underlying the dichotomous 0-1 attribute $\alpha$. If the tetrachoric correlations between attributes 1 and 2 is 0.5, the proportion of examinees that have mastered attribute 1 is 0.3 and the proportion of examinees that have mastered attribute 2 is 0.7, Eqn. 7 may be used to express the associated attributes as a set of independent attributes. As such, $KL_1^1$ to $KL_1^4$ may be calculated as:

$$KL_1^1 = \begin{pmatrix} 0 & 0 & 1.36 & 1.36 \\ 0 & 0 & 1.36 & 1.36 \\ \underline{1.14} & 1.14 & 0 & 0 \\ 1.14 & \underline{1.14} & 0 & 0 \end{pmatrix},$$

$$KL_1^2 = \begin{pmatrix} 0 & 0 & 1.36 & 1.36 \\ 0 & 0 & 1.36 & 1.36 \\ \underline{1.14} & 1.14 & 0 & 0 \\ 1.14 & \underline{1.14} & 0 & 0 \end{pmatrix},$$

$$KL_1^3 = \begin{pmatrix} 0 & 0 & 1.36 & 1.36 \\ 0 & 0 & 1.36 & 1.36 \\ \underline{1.14} & 1.14 & 0 & 0 \\ 1.14 & \underline{1.14} & 0 & 0 \end{pmatrix}, \text{ and}$$

$$KL_1^4 = \begin{pmatrix} 0 & 0 & 1.36 & 1.36 \\ 0 & 0 & 1.36 & 1.36 \\ \underline{1.14} & 1.14 & 0 & 0 \\ 1.14 & \underline{1.14} & 0 & 0 \end{pmatrix},$$

where $B^1=(0\ 0)$, $B^2=(0\ 1)$, $B^3=(1\ 0)$, and $B^4=(1\ 1)$.

In addition, for purposes of this example, $B^1$ has probability 0.22, $B^2$ has probability 0.08, $B^3$ has probability 0.52, and $B^4$ has probability 0.18. The probabilities for B may be calculated such that the association between the attributes is equal to the estimated tetrachoric correlations as explained above. Actual computation of the probabilities may be performed using a Monte Carlo simulation of examinees with the specified tetrachoric correlation and proportion of masters. To compute $\delta_1^C(1)$ using the weights specified in Eqn. 7, the probability distribution of the $\alpha^*$'s (i.e., the independent attributes) are also estimated. Because the $\alpha^*$'s are independent, the probability of the joint $\alpha^*$ distribution is the product of the marginal probabilities for each attribute, $\alpha_k^*$. In this example, the probability that a random examinee is a master of attribute 1, $P(\alpha_1^*=1)$, is 0.300 and the probability that a random examine is master of attribute 2, $P(\alpha_2^*=1)$, is 0.818. As such, it follows that $\alpha^*=(0\ 0)$ has probability 0.13 (i.e., $(1-0.3)(1-0.818)$), $\alpha^*=(0\ 1)$ has probability 0.57, $\alpha^*=(1\ 0)$ has probability 0.05, and $\alpha^*=(1\ 1)$ has probability 0.25. Thus:

$$\Delta_1^1(1) = \frac{.05(1.14) + .25(1.14)}{.3} = 1.14,$$

$$\Delta_1^2(1) = \frac{.05(1.14) + .25(1.14)}{.3} = 1.14,$$

$$\Delta_1^3(1) = \frac{.05(1.14) + .25(1.14)}{.3} = 1.14, \text{ and}$$

$$\Delta_1^4(1) = \frac{.05(1.14) + .25(1.14)}{.3} = 1.14.$$

Finally, $$\delta_1^C(1) = \frac{.22(1.14) + .08(1.14) + .52(1.14) + .18(1.14)}{1} = 1.14.$$

In addition, $\delta_2^C(1)$ may be calculated using the underlined values in the newly calculated $KL_2^1$ to $KL_2^4$ with respect to attribute 2:

$$KL_2^1 = \begin{pmatrix} 0 & 0 & 1.36 & 1.36 \\ \underline{0} & 0 & 1.36 & 1.36 \\ 1.14 & 1.14 & 0 & 0 \\ 1.14 & 1.14 & \underline{0} & 0 \end{pmatrix},$$

$$KL_2^2 = \begin{pmatrix} 0 & 1.36 & 0 & 1.36 \\ \underline{1.14} & 0 & 1.14 & 0 \\ 0 & 1.36 & 0 & 1.36 \\ 1.14 & 0 & \underline{1.14} & 0 \end{pmatrix},$$

$$KL_2^3 = \begin{pmatrix} 0 & 0 & 1.36 & 1.36 \\ \underline{0} & 0 & 1.36 & 1.36 \\ 1.14 & 1.14 & 0 & 0 \\ 1.14 & 1.14 & \underline{0} & 0 \end{pmatrix}, \text{ and}$$

$$KL_2^4 = \begin{pmatrix} 0 & 1.36 & 0 & 1.36 \\ \underline{1.14} & 0 & 1.14 & 0 \\ 0 & 1.36 & 0 & 1.36 \\ 1.14 & 0 & \underline{1.14} & 0 \end{pmatrix},$$

Specifically:

$$\Delta_2^1(1) = \frac{.05(0) + .25(0)}{.3} = 0,$$

$$\Delta_2^2(1) = \frac{.05(1.14) + .25(1.14)}{.3} = 1.14,$$

-continued $$\Delta_2^3(1) = \frac{.05(0) + .25(0)}{.3} = 0, \text{ and}$$

$$\Delta_2^4(1) = \frac{.05(1.14) + .25(1.14)}{.3} = 1.14.$$

Finally, $$\delta_1^C(1) = \frac{.22(0) + .08(1.14) + .52(0) + .18(1.14)}{1} = .30.$$

The indices $\delta_1^C(0)$ and $\delta_2^C(0)$ may also be calculated using similar equations. Because of the association between attribute 1 and attribute 2, the discrimination index $\delta^C$ is nonzero for attribute 2, where indices $\delta^A$ and $\delta^B$ are zero.

Test Construction

The previous sections have defined the CDMs of interest and provided four different indices that may be used as measures of an item's ability to discriminate between attribute patterns. Because a test index is simply the sum of all item indices, constructing a test to maximize correct classification rates may include selection of items with large discrimination indices. However, instances may exist where other constraints may be placed on a test which render test construction non-trivial.

Provided that the goal of cognitive diagnostic test construction is similar to the goals defined in CTT and IRT, methods of test construction for CTT and IRT may be applied to CDMs as well. Specifically, in CTT or IRT, items may be selected to form a test that maximizes reliability or information. In CDMs, items are selected to maximize a test's discrimination. Accordingly, the methods of test construction developed for CTT and IRT may be used to minimize measurement error in test construction using CDMs. Heuristics, linear programming and/or network flow may be used to select items from test construction from a test bank of N calibrated items.

Heuristic Test Construction

For a test with a fixed number of items, test reliability may be increased by F modifying either the item variances or the item discriminations. Similarly, in cognitive diagnostics, it may be possible to select items by focusing only on the item parameters that make the CDI index large. For example, for the DINA model, items with small $s_j$ and $g_j$ may be selected. For the RUM model, items with large $\pi_j^*$ and small $r_{jk}^*$'s.

In addition, reliability of a test may be defined as the ratio of the true score variance and the observed score variance. The item information, using a common factor model, may be defined as the ratio of the squared factor loading $\lambda^2$ over the item unique variance $\psi^2$. Items with large item information $\lambda^2/\psi^2$ may contribute to a high reliability and, therefore, by selecting the n items with the largest item information, reliability may be large.

Since the CDI has been defined as an item's measure of discrimination power, a similar method may be applied to CDMs. Such a method of test construction is effective because the CDI for each item is additive. By selecting the n items with the largest $CDI_j$, a test with the largest $CDI_t$ may be obtained. One problem with such a method may be that the Q-matrix is not incorporated. Accordingly, constraints with respect to item selection may be required, such as requiring each attribute to be measured by at least m items, where $o<m<n$.

To incorporate methods of test construction that use attribute discrimination (i.e., $\delta_k^A$, $\delta_k^B$, and a $\delta_k^C$), it may be necessary to consider methods of test construction developed for IRT. IRT may address test construction when more than one indicator of a good "item" is present. Test construction using IRT may be based on a test information function, $I_t(\theta)$. If the distribution of examinees' abilities is known, a test may reasonably be designed such that it is most informative for a majority of the examinees. In an embodiment, $I_t(\theta)$ may be summed across all item information functions ($I_j(\theta)$). As such, if the $\theta$ distribution is known, a test may be constructed by selecting the items that are most informative for that distribution.

In an embodiment, the information functions may be compared against a discrete set of $\theta$'s: $\theta_1, \theta_2, \ldots, \theta_C$, where C is some small value. Given a target $I_t(\theta)$, for each $\theta$, it may be possible to implement the heuristic described to minimize the distance between the target $I_t(\theta)$ and the test $I_t(\theta)$. For example, a weighted deviations model (WDM) may be defined where slack variables define an acceptable range of $I_t(\theta)$ at each $\theta_c$, $c=1, \ldots, C$. Determining the minimum value of $$\sum_{j=1}^{J} w_j d_{L_j} + \sum_{j=1}^{J} w_j d_{U_j},$$

where $d_{L_j}$ and $d_{U_j}$ indicate the extent that the information curve is below or above the provided limits if the item is selected may result in an optimal test item selection. The $w_j$'s may define a set of weights, or proportions, that represent the distribution of the abilities such that for every $\theta_c$ a $w_c$ exists, where $$\sum_{c=1}^{C} w_c = 1.$$

Such methods that dichotomize the $\theta$ distribution may be expanded to apply to $\delta_k$. In these cases, C=K, where K equals the number of attributes. For example, upper and lower bounds could be set for each attribute and $d_{L_j}$ and $d_{U_j}$ may indicate the extent that the attribute determinations across the K attributes are within the lower and upper boundaries, respectively.

One difficulty with applying this method to cognitive diagnosis may be that attribute boundary selection is not entirely clear. The discrimination indices for each attribute may be bounded by zero and infinity, and the relationship between correct classification rates and discrimination may not be explicitly defined (e.g., what is a high discrimination?).

Using the WDM, ranges may be provided for the constraints. For example, instead of requiring five items to measure a specific content area, any solution with two to five items measuring that content area may be permissible. In an embodiment, WDM may be optimized by 0-1 integer programming. Initially, n items may be selected to minimize $$\sum_{j=1}^{J} w_j d_{L_j} + \sum_{j=1}^{J} w_j d_{U_j}$$

using a greedy heuristic. After the n items are selected, each item may be re-evaluated to determine if the function may be made smaller by replacing it with other items in the test item bank. This procedure may be iterated upon until no improvement can be made.

In an alternate embodiment, if the weights $w_c$ are large then the resulting $I_t(\theta_c)$ for that particular $\theta_c$ may be larger than for a second $\theta_{c'}$ with a small $w_{c'}$. Given the $\theta_c$'s and the $w_c$, items may be selected to maximize the following function:

$$\prod_{c=1}^{C} I_t(\theta_c)^{w_c}.$$

The algorithm may c=1 allow a number of items to be supplied for a test. In selecting the next item, the function may be evaluated for one, some or all items remaining in the test item back, and the item that maximizes the function may be selected. The process may iterate until n items have been selected. While the function does not directly incorporate constraints, such constraints may be included when determining which items in the test item bank to evaluate.

This method may be applied to cognitive diagnosis and the attribute discrimination, $\delta_k$. Here, the function may be written in terms of discrimination as:

$$\prod_{k=1}^{K} \delta_k^{w_k},$$

where $\delta_k$ can represent $\delta_k(1)$, $\delta_k(0)$, or any linear combination of the two (e.g., $0.5\,\delta_k(1)+0.5\,\delta_k(0)$). Weights may be determined as a function of the importance of each attribute. Items may be selected as previously defined.

Other heuristics may redefine the target function after the $j-1^{3t}$ item is selected. For example, the normalized weighted absolute deviation heuristic (NWADH) for test construction, which allows for multiple constraints and content requirements as an extension of heuristics that minimize the absolute difference between a target $I_t(\theta)$, T, and the constructed $I_t(\theta)$. NWADH may define a set of j objective functions for j= 1, ..., n as in $$\max \sum_{i=1}^{n} e_i x_i$$

subject to $$\max \sum_{i=1}^{n} x_i = j,$$

$$e_i = 1 - \frac{d_i}{\sum_{i \in R_j 1} d_i}, \text{ and}$$

$$d_i = \left| \frac{T - \sum_{k=1}^{t} u_k x_k}{n - j + 1} \right| - u_i; \; i \in R_{j-1},$$

where $x_i$ is a binary variable and u represents the test information. When selecting the $j^{th}$ item, $$\max \sum_{i=1}^{n} e_i x_i$$

may be a function of the j−1 items that have already been selected. This method of test construction may be modified to use either the CDI, by setting u=CDI, or $\delta_k$, by allowing T to be some function of the attributes.

Linear Programming

Additional methods of test construction may be performed using linear programming. For example, such methods may guarantee a maximum reliability or a lower bound of reliability for an item bank. In an embodiment, a maximum value for the following function may be determined:

$$\frac{n}{n-1}\left[1 - \frac{\sum_{j=1}^{N} \sigma_j^2 y_j}{\left(\sum_{j=1}^{N} \sigma_j^2 \rho_{jx} y_j\right)^2}\right],$$

$y_j$ is simply an integer value that can only be 0 or 1. If $y_j=1$, the item is selected for the test and if, the item is selected for the test and if $y_j=0$, the item is not included in the equation and therefore is not selected for the test. If $$\sum_{i=1}^{N} y_j = n$$

is included as a constraint, only n items may be selected in the maximization algorithm.

The objective function defined above is a nonlinear function of the item parameters. However, the function may be simplified such that 0-1 linear programming may be used. In an embodiment, if the numerator is bounded above by a constraint, the maximization of the denominator may lead to a large reliability and the function may be re-expressed as the maximization of the following function:

$$\sum_{i=1}^{N} \sigma_i \rho_{ix} y_i,$$

given the constraints:

$$\sum_{i=1}^{N} y_i = n$$

and $$\sum_{i=1}^{N} \sigma_i^2 y_i \leq c,$$

where $0 \leq c \leq n/4$. Since the objective function and the second constraint are each functions of $\sigma_j$, then if c is small, the objective function may be small, and if c is large, the objective function may be large.

A second model may be defined such that c above is not required. Specifically, the objective is to maximize $$\sum_{j=1}^{N} \rho_{jx} y_j$$

conditional on $$\sum_{i=1}^{N} y_i = n$$

and any constraints satisfying the form $$\sum_{j=1}^{N} v_{jx} y_j \leq w_z,$$

where $V_{jz}$ represents any quantification of the $j^{th}$ item for the $z^{th}$ constraint and $w_z$ represents the limit for a test.

The above models of CTT test construction may be applied to cognitive diagnosis using the CDI. However, the above models may not be applied since a test is not a linear function of the item parameters. By maximizing the objective function $$\sum_{j=1}^{N} CDI_j y_j,$$

a test may be constructed to maximize $CDI_t$. As previously defined, $y_j$ may either be 0 or 1. Constraints may be added, such as the constraints in the Q-matrix and the like.

When integer programming is applied to IRT, $I_t(\theta)$ may be maximized. If the distribution of $\theta$ is represented by a discrete set of K abilities, $\{\theta_1, \ldots, \theta_K\}$, and the importance of these values are defined with a set of K weights, $\{r_1, \ldots, r_K\}$, the target $I_t(\theta)$ may be characterized by the values $\{r_1 y, \ldots, r_K y\}$ where y is a dummy variable representing the information to be maximized. Formally:

max y subject to $$\sum_{i=1}^{I} I_i(\theta_k) x_i - r_k y \geq 0, \forall k = 1, 2, \ldots, K,$$

$$\sum_{i=1}^{I} x_i = n,$$

where $x_i$ is a 0-1 variable and $y \geq 0$.

Additional constraints may be added to control item content, time requirements and exposure rates. A wide range of other constraints, such as maximizing test information, minimizing test administration time and/or the like, may also be used.

IRT may again provide a method of test construction that applies to $\delta_k$. The objective function above may be modified as follows:

max y subject to $$\sum_{i=1}^{I} \delta_{ik} x_i - r_k y \geq 0, \forall k = 1, 2, \ldots, K,$$

$$\sum_{i=1}^{I} x_i = n,$$

where
  y is the attribute's discriminating power, and
  $r_k$ defines weights for the K attributes with respect to y.

Since the IRT function included K discrete points for $\theta$, the function may easily be adjusted to K attributes. Using integer programming, an optimal set of items may be selected such that the attributes have the relationship specified by the $r_k$'s.

Network Flow

While integer programming may provide useful results, it may also be computationally intensive. Alternatively, network-flow algorithms may be used to solve many of the same problems. If a problem can be formulated as a network-flow problem, it may be solved in only polynomial time, which may be much quicker than linear programming. For example, the second model described in the linear programming section may be formulated as a network-flow problem where items may be grouped into n subsets, D(j), where the indices for each subset are represented by J(i). In an embodiment, the items may be allowed to group P(g) content subgroups having $N_g$ items in the item bank where $n_g$ is the number of items that are to be selected from the P(g) content group. In addition, $Y_{ij} \in \{0, 1\}$; $z_{ij} \in \{0, 1\}$; $j \in J(i)$, for each $i=1, 2, \ldots, N$. In this model, $y_{ij}=1$ if the $i^{th}$ item is included for $j \in J(i)$ and $z_i=1$ when the $i^{th}$ item is not to be selected. Based upon the above definitions, the network-flow problem may be described as follows:

$$\max \sum_{i=1}^{N} \rho_{ix} y_i,$$

given the constraints $$\sum_{i \in D(j)} y_{ij} = 1,$$

$$\sum_{j \in J(i)} y_{ij} + z_i = 1, \text{ and}$$

$$\sum_{i \in P(g)} z_i = N_g - n_g,$$

given the constraints:
for all $j=1, 2, \ldots, n$; $i=1, 2, \ldots, N$; and $g=1, 2, \ldots, G$. Similar methods may be applied to construct a test when calibrated using a CDM such as the DINA or RUM models.

CDM Test Construction

FIG. 1A depicts a flow diagram for an exemplary method for constructing a test according to an embodiment. As shown in FIG. 1A, an item bank may be identified 105. The item bank may include a plurality (N) of items that measure one or more (K) attributes. A Q-matrix identifying which attributes are measured by each item may be generated based on the items in the item bank. Accordingly, an (N×K) 0-1 Q-matrix may be generated 110, where each row corresponds to a particular item and each column corresponds to a particular attribute. In an embodiment, the sum of the entries in each row may be at least 1 and no more than 4.

In an embodiment, the parameters for each item may also be identified 115. The parameters may be identified by, for example, pre-testing the items with examinees having known attributes. In an alternate embodiment, analysis of test items previously administered to a large examinee base may be used to generate the parameters.

A first item may then be selected 120 from the item bank. The first item may have the largest index and may satisfy each of one or more constraints for the test. The index may include, for example, $CDI_j$, $KL_{juv}$, $s_j$, $g_j$, $\delta_{jk}^A$, $\delta_{jk}^B$, $\delta_{jk}^C$ or a combination of one or more such attributes or similar attributes. For example, a weighted sum of particular attributes may be used to determine the selected test item. The constraints may include, without limitation, the attributes for which the exam is testing, a number of attributes required per test item, the number of test items to test for a particular attribute, and the like.

The remaining items in the item bank may then be evaluated 125 to determine whether each item would conform to the one or more constraints if chosen. For example, if a test requires only a particular number of test items for a particular attribute and the particular number of test items have already been selected, test items testing for the particular attribute may not be considered when selecting the next item from the item bank.

A next test item may then be selected 130 from the item bank such that the index for the next test item is the maximum of all items in the item bank that satisfy the one or more constraints. The evaluation 125 and selection 130 steps may be performed until a pre-determined number of test items have been selected for the test. In an alternate embodiment, if each test item has a variable denoting an expected amount of time required to complete the test item that is associated with the test item, the evaluation 125 and selection 130 steps may be performed until a total expected time to complete all of the selected test items falls within a range. Other constraints may also be used to determine when to terminate the performance of the evaluation 125 and selection 130 steps.

Figure 1B:
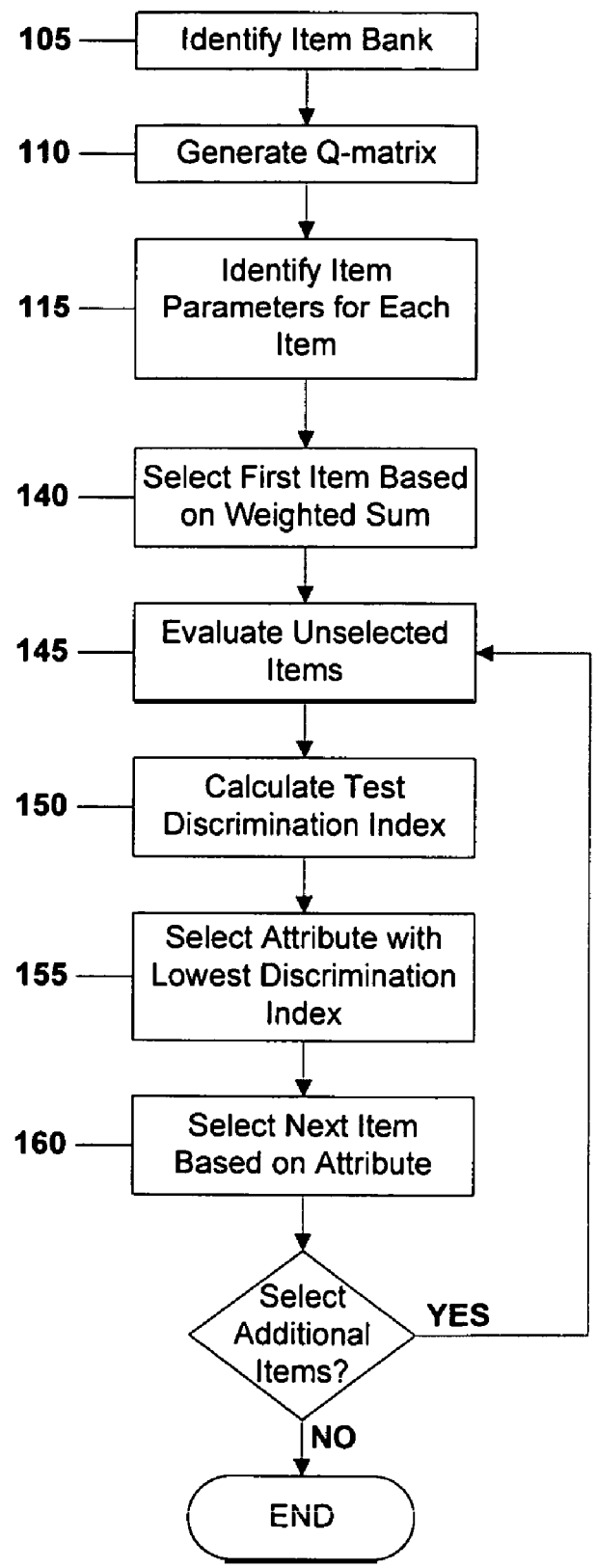
FIG. 1B depicts a flow diagram for an alternate exemplary method for constructing a test according to an embodiment.

FIG. 1B depicts a flow diagram for an alternate exemplary method for constructing a test according to an embodiment. As shown in FIG. 1B, the item bank may be identified 105, the Q-matrix may be generated 110, and the parameters for each test item may be identified 115 as described above in reference to FIG. 1A. The first item may then be selected 140 based on its index. For example, one or more of the attribution discrimination indices may be used. In an embodiment, a weighted sum of an attribute discrimination index may be used. In other words, $\psi_{jk}^A$ may be defined as a weighted sum of the attribute discrimination index A for the masters and the attribute discrimination index A for the non-masters of the $j^{th}$ item for the $k^{th}$ attribute, such that $\psi_{jk}^A = w_k^A \delta_{jk}^A(1) + (1-w_k^A) \delta_{jk}^A(0)$, where $0 \leq w_k^A \leq 1$ and $w_k^A$ represents the importance of the discrimination of the masters for the $k^{th}$ attribute. Alternate weighted sums may be calculated for the other discrimination indices as well. The weighted sum may be used to reflect the cost of misclassification.

The test item having, for example, the largest $\psi_{jk}$ across all attributes and items that satisfy each of one or more constraints may then be selected 140. The constraints may include, without limitation, the attributes for which the exam is testing, a number of attributes required per test item, the number of test items to test for a particular attribute, and the like.

Each remaining item in the item bank may then be evaluated 145 to determine whether, if selected, it would conform to the specified constraints.

The test attribute discrimination index may then be calculated 150 for all attributes k=1, . . . , K using the J items that have already been selected. The test attribute discrimination index of the J items selected for attribute k, $\psi_{tk}$, may be equal to the sum of the item discrimination indices across the J items. In other words, $$\psi_{tk} = \sum_{j=1}^{J} \psi_{jk}.$$

An attribute k' may then be selected 155. In an embodiment, the attribute k' may be selected 155, such that $\psi_{tk'}$=min ($\psi_{tk} \forall k=1, \ldots, K$). In other words, the selected attribute k' may be the attribute having the lowest attribute discrimination index of all attributes considered for the test.

A next test item may then be selected 160 from the item bank such that the attribute discrimination index for attribute k' for the selected test item is the maximum of all items in the item bank that satisfy the one or more constraints. The evaluation, computation, attribute selection and next item selection steps may be performed until the required number of test items have been selected for the test. In an alternate embodiment, if each test item has a variable denoting an expected amount of time required to complete the test item that is associated with the test item, the evaluation, computation, attribute selection and next item selection steps may be performed until a total expected time to complete all of the selected test items falls within a range. Other constraints may also be used to determine when to terminate the performance of the evaluation, computation, attribute selection and next item selection steps.

Figure 2:
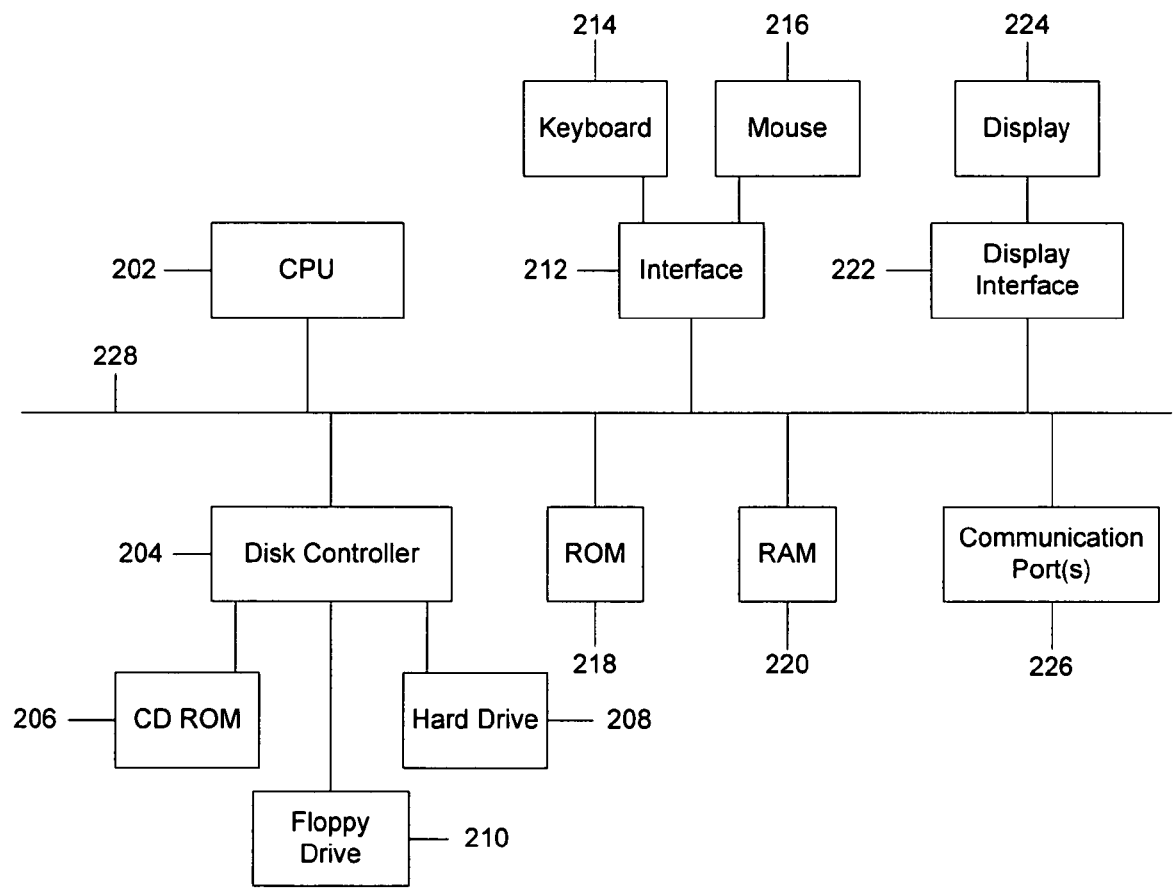
FIG. 2 is a block diagram of exemplary internal hardware that may be used to contain or implement the program instructions of a system embodiment.

FIG. 2 is a block diagram of exemplary internal hardware that may be used to contain or implement the program instructions of a system embodiment. Referring to FIG. 2, a bus 228 serves as the main information highway interconnecting the other illustrated components of the hardware. CPU 202 is the central processing unit of the system, performing calculations and logic operations required to execute a program. Read only memory (ROM) 218 and random access memory (RAM) 220 constitute exemplary memory devices.

A disk controller 204 interfaces with one or more optional disk drives to the system bus 228. These disk drives may be external or internal floppy disk drives such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet or an intranet.

In addition to the standard computer-type components, the hardware may also include an interface 212 which allows for receipt of data from input devices such as a keyboard 214 or other input device 216 such as a remote control, pointer and/or joystick.

An embedded system may optionally be used to perform one, some or all of the operations of the present invention. Likewise, a multiprocessor system may optionally be used to perform one, some or all of the operations of the present invention. Moreover, a computer-readable carrier containing one or more programming instructions may be used to perform one or more of the methods of using the discrimination indices described above.

It will be appreciated that various of the above-disclosed and other features and functions, or alternatives thereof, may be desirably combined into many other different systems, methods or applications. It will also be appreciated that various presently unforeseen or unanticipated alternatives, modifications, variations or improvements therein may be subsequently made by those skilled in the art.

What is claimed is:

1. A computer-implemented method for selecting test items from an item bank for a test, the method comprising:
    accessing a plurality of test items in an item bank, wherein each test item includes a multi-attribute discrimination index, wherein a multi-attribute discrimination index includes an attribute value for each of a plurality of tested attributes, wherein an attribute value identifies an ability of a test item to assess a particular tested attribute;
    identifying one of the tested attributes;
    selecting a first test item for a test from the item bank based on the identified attribute and the multi-attribute discrimination indexes of the test items, remaining unselected items from the item bank being unselected test items;
    identifying a least tested attribute based on the multi-attribute discrimination indexes of selected test items;
    assigning a weight to each tested attribute based on the identified least tested attribute;
    for an unselected test item, evaluating the test item using a processing system to determine whether one or more first constraints would be satisfied if the test item were selected for the test in combination with the first test item selected and any other previously selected test items;
    selecting a next test item for the test from the unselected test items that satisfy the one or more first constraints using a weighted sum based on the multi-attribute discrimination indexes and the assigned weights;
    repeating the evaluating and the selecting a next test item for the test until one or more second constraints are satisfied; and
    storing selected test items for the test on a computer-readable memory.

2. The method of claim 1 wherein the one or more first constraints include a number of test items that test for a particular one of the tested attributes.

3. The method of claim 1 wherein the one or more first constraints include a number of test items that test for a particular number of the tested attributes.

4. The method of claim 1 wherein the one or more second constraints include a number of test items for a test.

5. The method of claim 1 wherein the one or more second constraints include an expected time to complete a test.

6. The method of claim 1, wherein the multi-attribute discrimination index is determined based on the Kullback-Leibler information for discrimination of any two attribute mastery patterns.

7. The method of claim 1, wherein the multi-attribute discrimination index is determined based on a weighted mean of the squared Euclidean distance of any two attribute patterns;
    wherein the squared Euclidean distance of any two attribute patterns, $\alpha$, $\alpha'$, is calculated according to $$d^2(\alpha, \alpha') = \sum_{k=1}^{K} (\alpha_k - \alpha'_k)^2,$$

where $\alpha$ is an attribute mastery pattern, $\alpha'$ is an alternative attribute mastery pattern, $d^2(\alpha,\alpha')$ is the squared Euclidean distance between the two attribute mastery patterns, and K is the number of attributes.

8. The method of claim 1, wherein the multi-attribute discrimination index is determined using attribute mastery patterns that differ on one attribute while holding attribute mastery constant on any other attributes.

9. The method of claim 1, wherein the multi-attribute discrimination index is determined based on attribute mastery patterns and predetermined associations of attributes.

10. A non-transitory computer-readable storage medium containing programming instructions for selecting test items from an item bank for a test, the programming instructions when executed causing a processing system to execute steps comprising:
    accessing a plurality of test items in an item bank, wherein each test item includes a multi-attribute discrimination index, wherein a multi-attribute discrimination index includes an attribute value for each of a plurality of tested attributes, wherein an attribute value identifies an ability of a test item to assess a particular tested attribute;
    identifying one of the tested attributes;
    selecting a first test item for a test from the item bank based on the identified attribute and the multi-attribute discrimination indexes of the test items, remaining unselected items from the item bank being unselected test items;
    identifying a least tested attribute based on the multi-attribute discrimination indexes of selected test items;
    assigning a weight to each tested attribute based on the identified least tested attribute;
    for an unselected test item, evaluating the test item using a processing system to determine whether one or more first constraints would be satisfied if the test item were selected for the test in combination with the first test item selected and any other previously selected test items;
    selecting a next test item for the test from the unselected test items that satisfy the one or more first constraints using a weighted sum based on the multi-attribute discrimination indexes and the assigned weights;
    repeating the evaluating and the selecting a next test item for the test until one or more second constraints are satisfied; and
    storing selected test items for the test on a computer-readable memory.

11. A computer-implemented system for selecting test items from an item bank for a test, the system comprising: a processing system;
    a computer-readable memory comprising instructions for causing the processing system to execute steps including:
    accessing a plurality of test items in an item bank, wherein each test item includes a multi-attribute discrimination index, wherein a multi-attribute discrimination index includes an attribute value for each of a plurality of tested attributes, wherein an attribute value identifies an ability of a test item to assess a particular tested attribute;

identifying one of the tested attributes;

selecting a first test item for a test from the item bank based on the identified attribute and the multi-attribute discrimination indexes of the test items at remaining unselected items from the item bank being unselected test items;

identifying a least tested attribute based on the multi-attribute discrimination indexes of selected test items;

assigning a weight to each tested attribute based on the identified least tested attribute;

for an unselected test item, evaluating the test item using a processing system to determine whether one or more first constraints would be satisfied if the test item were selected for the test in combination with the first test item selected and any other previously selected test items;

selecting a next test item for the test from the unselected test items that satisfy the one or more first constraints using a weighted sum based on the multi-attribute discrimination indexes and the assigned weights;

repeating the evaluating and the selecting a next test item for the test until one or more second constraints are satisfied; and storing selected test items for the test on a computer-readable memory.

12. The system of claim 11 wherein the one or more first constraints include a number of test items that test for a particular one of the tested attributes.

13. The system of claim 11 wherein the one or more first constraints include a number of test items that test for a particular number of tested attributes.

14. The system of claim 11 wherein the one or more second constraints include a number of test items for a test.

15. The system of claim 11 wherein the one or more second constraints include an expected time to complete a test.

* * * * *